United States Patent
Winningham

(10) Patent No.: US 11,236,998 B1
(45) Date of Patent: Feb. 1, 2022

(54) ALIGNMENT DEVICE

(71) Applicant: John Winningham, Leighton, AL (US)

(72) Inventor: John Winningham, Leighton, AL (US)

(*) Notice: Subject to any disclaimer, the term of this patent is extended or adjusted under 35 U.S.C. 154(b) by 0 days.

(21) Appl. No.: 17/029,650

(22) Filed: Sep. 23, 2020

(51) Int. Cl.
*G01C 9/28* (2006.01)
*G01B 5/24* (2006.01)

(52) U.S. Cl.
CPC ........... *G01C 9/28* (2013.01); *G01B 5/24* (2013.01)

(58) Field of Classification Search
CPC ...................................................... G01C 9/28
USPC ............................................ 33/379, 451, 465
See application file for complete search history.

(56) References Cited

U.S. PATENT DOCUMENTS

| | | | |
|---|---|---|---|
| 1,602,698 A | 10/1926 | Nielsen | |
| 4,194,295 A * | 3/1980 | Simuro | G01B 3/06 33/451 |
| 4,922,621 A * | 5/1990 | Maier | B25H 7/00 33/451 |
| 5,438,761 A * | 8/1995 | Krumszyn | G01B 3/56 33/375 |
| 5,452,522 A * | 9/1995 | Kook | B25H 7/02 33/418 |
| 6,029,359 A * | 2/2000 | Szumer | G01C 9/28 33/373 |
| 6,082,190 A | 7/2000 | Breidenbach | |
| 6,305,092 B1 * | 10/2001 | Tufariello | G01C 9/28 33/371 |
| 6,543,148 B2 * | 4/2003 | Tufariello | G01C 9/28 33/371 |
| 7,065,890 B1 * | 6/2006 | Chang | G01C 15/004 33/227 |
| 7,076,884 B1 | 7/2006 | Horn | |
| 7,676,940 B2 * | 3/2010 | Spaulding | G01C 9/28 33/373 |
| 7,797,848 B2 * | 9/2010 | Cobb | G01C 9/26 33/374 |
| 9,182,224 B2 | 11/2015 | Lokshyn | |
| 9,234,751 B2 | 1/2016 | Silberberg | |
| 9,651,373 B1 | 5/2017 | Carpenter | |
| 9,885,571 B2 * | 2/2018 | Hoppe | G01C 9/34 |
| D842,141 S | 3/2019 | Forestieri, Sr. | |
| 10,809,060 B2 * | 10/2020 | Bryce | G01C 9/34 |
| 2003/0217473 A1 * | 11/2003 | Pampel | B43L 7/10 33/471 |

(Continued)

FOREIGN PATENT DOCUMENTS

WO WO2012110998 8/2012

*Primary Examiner* — George B Bennett

(57) ABSTRACT

An alignment device for aligning a pair of substrates includes a second bar rotationally engaged by a first terminus to a second end of a first bar. A spirit level engaged to a first end of the first bar extends bidirectionally therefrom. A fastener rotationally engaged to the first and second bars is positioned to selectively fix the first bar relative to the second bar. With the second bar positioned on a mating surface of a first substrate, a user can rotate the first bar relative to the second bar so that the spirit level indicates horizontal and then engage the fastener. Upon positioning the second bar on a mating face of a second substrate, the user is positioned to orient the second substrate so that the spirit level indicates horizontal, wherein the mating face of the second substrate is aligned with the mating surface of the first substrate.

8 Claims, 2 Drawing Sheets

(56) References Cited

U.S. PATENT DOCUMENTS

Figure 1:
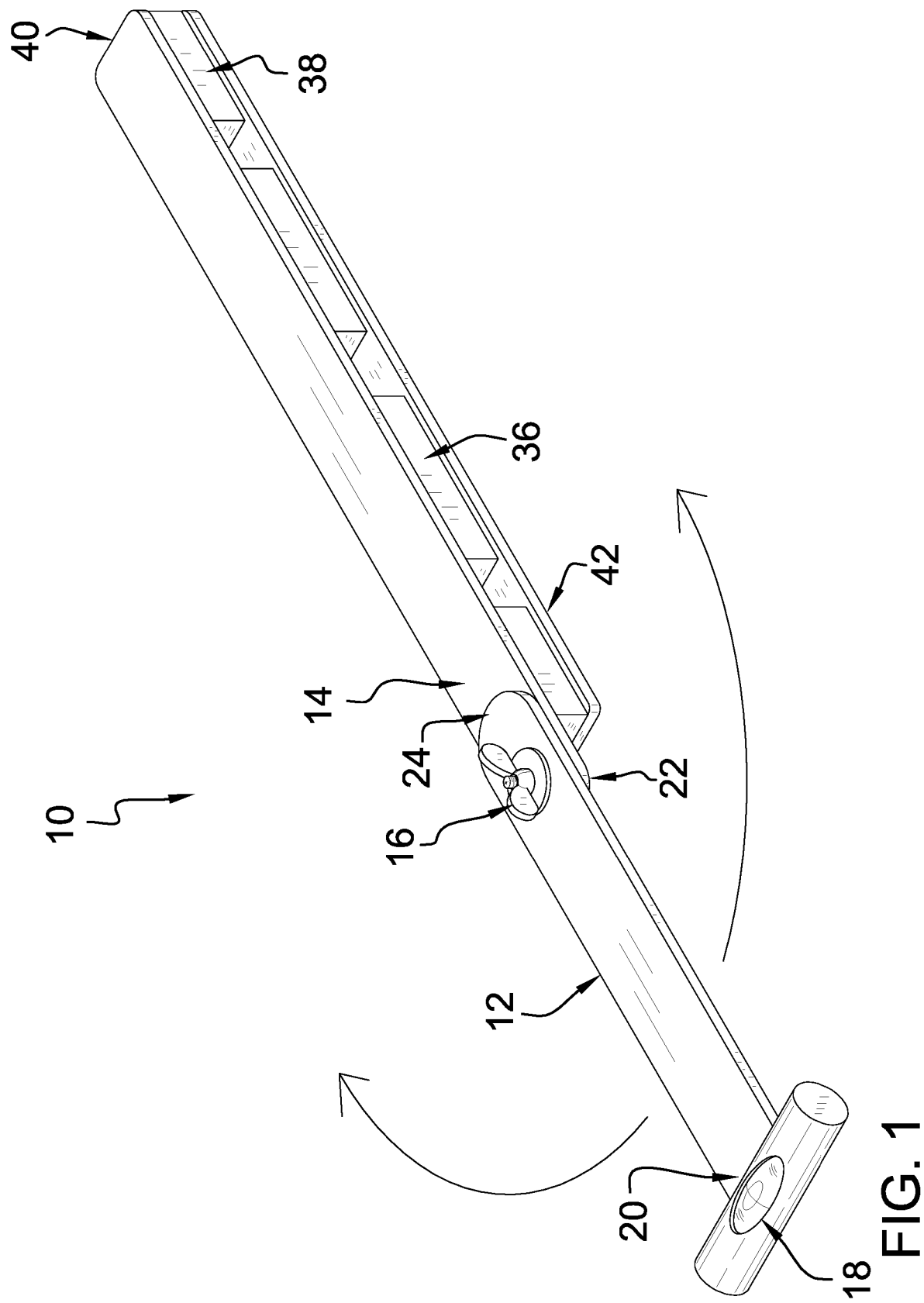

| | | | |
|---|---|---|---|
| 2008/0034599 A1* | 2/2008 | Hamilton | B25H 7/00 33/471 |
| 2013/0192077 A1* | 8/2013 | Colombo | G01B 5/12 33/701 |
| 2015/0101203 A1 | 4/2015 | Ligh | |

* cited by examiner

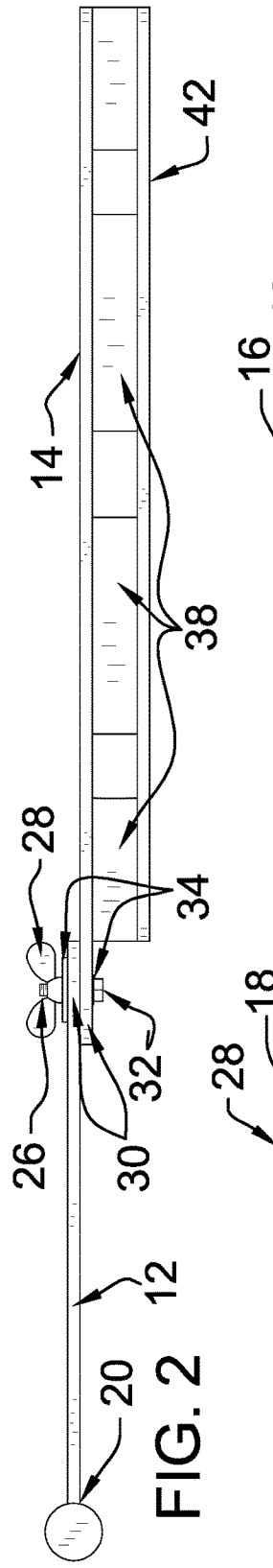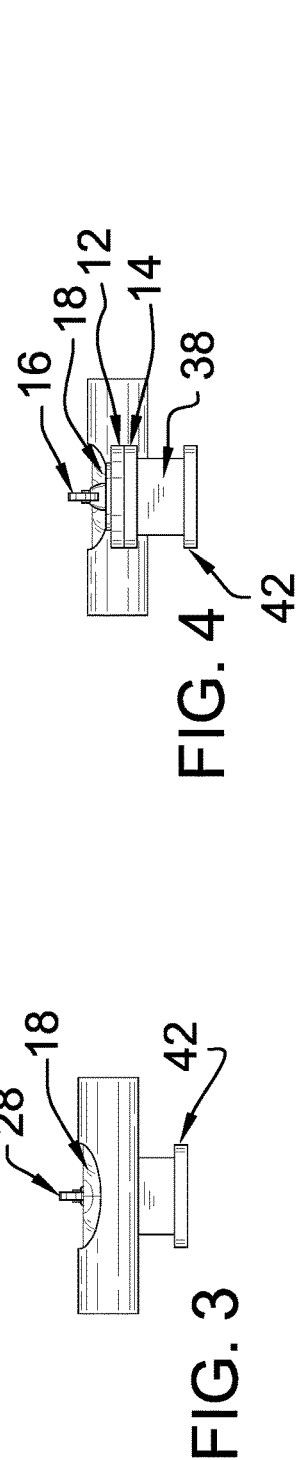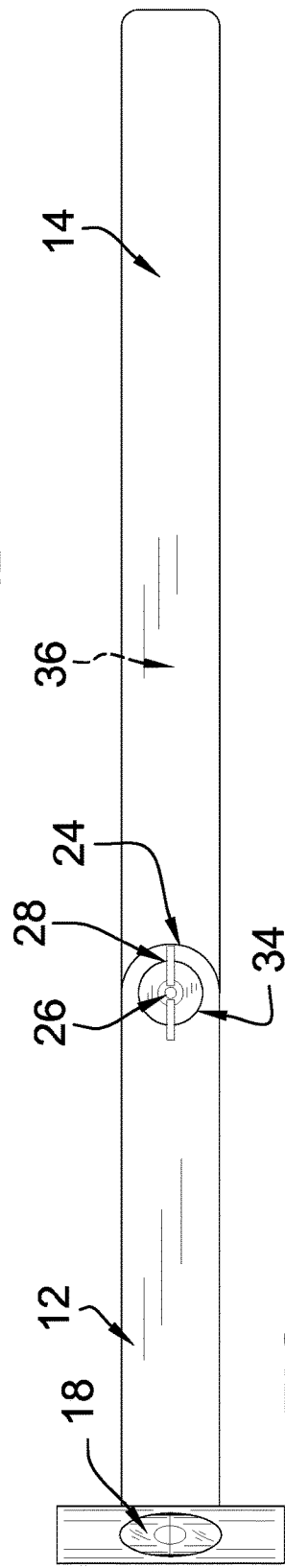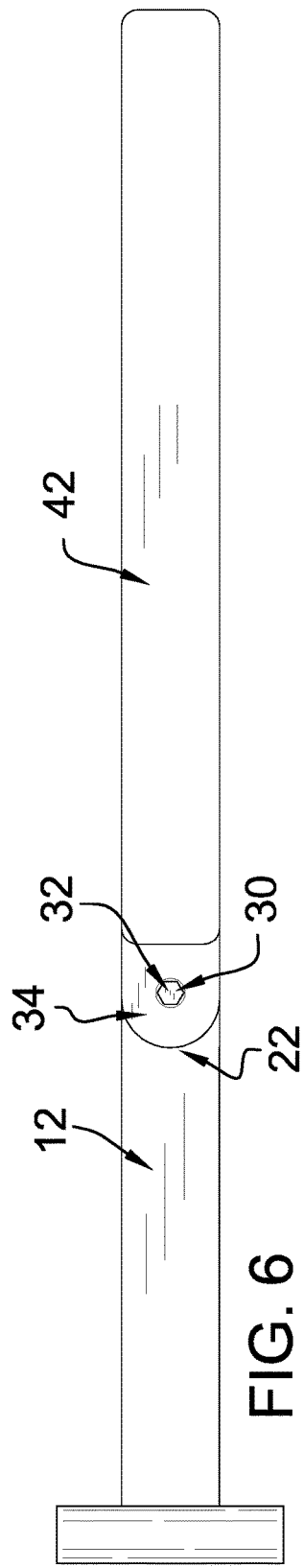

ALIGNMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alignment devices and more particularly pertains to a new alignment device for aligning a pair of substrates.

(2) Description of Related Art Including Information Disclosed Under 37 CFR 1.97 and 1.98

The prior art relates to alignment devices. Prior art alignment devices may comprise lights, inclinometers, levels, angle sensors, and the like.

BRIEF SUMMARY OF THE INVENTION

An embodiment of the disclosure meets the needs presented above by generally comprising a first bar, a second bar, and a fastener. A spirit level is engaged to a first end of the first bar and extends bidirectionally therefrom. The second bar is rotationally engaged by a first terminus to a second end of the first bar. The fastener, which is rotationally engaged to the first bar and the second bar, is positioned to engage the first bar and the second bar selectively and fixedly.

The second bar is configured to be positioned on a mating surface of a first substrate, such as a bell housing, positioning a user to rotate the first bar relative to the second bar so that the spirit level indicates horizontal. The user then is positioned to engage the fastener to fixedly position the second bar relative to the first bar. Upon positioning the second bar on a mating face of a second substrate, such as a transmission, the user is positioned to orient the second substrate so that the spirit level indicates horizontal, wherein the mating face of the second substrate is aligned with the mating surface of the first substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top side end perspective view of an alignment device according to an embodiment of the disclosure.
FIG. 2 is a side view of an embodiment of the disclosure.
FIG. 3 is an end view of an embodiment of the disclosure.
FIG. 4 is an end view of an embodiment of the disclosure.
FIG. 5 is a top view of an embodiment of the disclosure.
FIG. 6 is a bottom view of an embodiment of the disclosure.

DETAILED DESCRIPTION OF THE INVENTION

With reference now to the drawings, and in particular to FIGS. 1 through 6 thereof, a new alignment device embodying the principles and concepts of an embodiment of the disclosure and generally designated by the reference numeral 10 will be described.

As best illustrated in FIGS. 1 through 6, the alignment device 10 generally comprises a first bar 12, a second bar 14, and a fastener 16. A spirit level 18 is engaged to a first end 20 of the first bar 12 and extends bidirectionally therefrom. The second bar 14 is rotationally engaged by a first terminus 22 to a second end 24 of the first bar 12. The fastener 16, which is rotationally engaged to the first bar 12 and the second bar 14, is positioned to engage the first bar 12 and the second bar 14 selectively and fixedly, so that the first bar 12 is fixedly positioned relative to the second bar 14.

The second bar 14 is configured to be positioned on a mating surface of a first substrate, such as a bell housing, positioning a user to rotate the first bar 12 relative to the second bar 14 so that the spirit level 18 indicates horizontal. The user then is positioned to engage the fastener 16 to fixedly position the second bar 14 relative to the first bar 12. Upon positioning the second bar 14 on a mating face of a second substrate, such as a transmission, the user is positioned to orient the second substrate so that the spirit level 18 indicates horizontal, wherein the mating face of the second substrate is aligned with the mating surface of the first substrate.

The fastener 16 may comprise a bolt 26 and a wingnut 28, or other fastening means, such as, but not limited to, clamps, clips, and the like. The bolt 26 extends through a pair of holes 30, which are positioned singly in the first bar 12 and the second bar 14. The wingnut 28 is threadedly engaged to the bolt 26 so that the first bar 12 and the second bar 14 are sandwiched between the wingnut 28 and a head 32 of the bolt 26. The device 10 may comprise a pair of washers 34, with one washer 34 being positioned between the head 32 of the bolt 26 and the second bar 14, while the other washer 34 is positioned between the wingnut 28 and the first bar 12. The washers 34 facilitate rotation of the first bar 12 relative to the second bar 14.

A connector 36 is engaged to the second bar 14 and is configured to selectively engage at least one of the first substrate and the second substrate to removably engage the second bar 14 thereto. The connector 36 may comprise a magnet 38, or other connecting means, such as, but not limited to, suction cups, adhesives, and the like. The magnet 38 is useful when either the first substrate or the second substrate comprise ferromagnetic material. The magnet 38 may be one of set of magnets 38, which extends from proximate to the first terminus 22 to proximate to a second terminus 40 of the second bar 14. A third bar 42 is engaged to the magnet 38 so that the magnet 38 is positioned between the second bar 14 and the third bar 42.

In use, the second bar 14 is positioned on a mating surface of a first substrate. The user rotates the first bar 12 relative to the second bar 14 so that the spirit level 18 indicates horizontal and then engages the fastener 16. Upon positioning the second bar 14 on a mating face of a second substrate, the user is positioned to orient the second substrate so that the spirit level 18 indicates horizontal, wherein the mating face of the second substrate is aligned with the mating surface of the first substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An alignment device comprising:
a first bar;
a spirit level engaged to a first end of the first bar and extending bidirectionally therefrom;
a second bar rotationally engaged by a first terminus to a second end of the first bar; and
a fastener rotationally engaged to the first bar and the second bar, the fastener being positioned for selectively fixedly engaging the first bar and the second bar, wherein the second bar is configured for positioning on a mating surface of a first substrate, positioning a user for rotating the first bar relative to the second bar such that the spirit level indicates horizontal and for engaging the fastener for fixedly positioning the second bar relative to the first bar, whereupon the second bar is positioned on a mating face of a second substrate, positioning the user for orienting the second substrate such that the spirit level indicates horizontal, wherein the mating face of the second substrate is aligned with the mating surface of the first substrate.

2. The alignment device of claim 1, wherein the fastener comprises a bolt and a wingnut, the bolt extending through a pair of holes positioned singly in the first bar and the second bar, the wingnut being threadedly engaged to the bolt such that the first bar and the second bar are sandwiched between the wingnut and a head of the bolt.

3. The alignment device of claim 2, further including a pair of washers, one washer being positioned between the head of the bolt and the second bar, the other washer being positioned between the wingnut and the first bar.

4. The alignment device of claim 1, further including a connector engaged to the second bar and being configured for selectively engaging at least one of the first substrate and the second substrate for removably engaging the second bar thereto.

5. The alignment device of claim 1, wherein the connector comprises a magnet.

6. The alignment device of claim 5, wherein the magnet is one of set of magnets extending from proximate to the first terminus to proximate to a second terminus of the second bar.

7. The alignment device of claim 5, further including a third bar engaged to the magnet, such that the magnet is positioned between the second bar and the third bar.

8. An alignment device comprising:
a first bar;
a spirit level engaged to a first end of the first bar and extending bidirectionally therefrom;
a second bar rotationally engaged by a first terminus to a second end of the first bar;
a fastener rotationally engaged to the first bar and the second bar, the fastener being positioned for selectively fixedly engaging the first bar and the second bar, wherein the second bar is configured for positioning on a mating surface of a first substrate, positioning a user for rotating the first bar relative to the second bar such that the spirit level indicates horizontal and for engaging the fastener for fixedly positioning the second bar relative to the first bar, whereupon the second bar is positioned on a mating face of a second substrate, positioning the user for orienting the second substrate such that the spirit level indicates horizontal, wherein the mating face of the second substrate is aligned with the mating surface of the first substrate, the fastener comprising a bolt and a wingnut, the bolt extending through a pair of holes positioned singly in the first bar and the second bar, the wingnut being threadedly engaged to the bolt such that the first bar and the second bar are sandwiched between the wingnut and a head of the bolt;
a pair of washers, one washer being positioned between the head of the bolt and the second bar, the other washer being positioned between the wingnut and the first bar;
a connector engaged to the second bar and being configured for selectively engaging at least one of the first substrate and the second substrate for removably engaging the second bar thereto, the connector comprising a magnet, the magnet being one of set of magnets extending from proximate to the first terminus to proximate to a second terminus of the second bar; and a third bar engaged to the magnet, such that the magnet is positioned between the second bar and the third bar.

\* \* \* \* \*